Oct. 28, 1941.　　　M. A. KENDALL　　　2,261,088
BELT CONVEYER
Filed April 25, 1940　　　2 Sheets-Sheet 1

INVENTOR.
Myron A. Kendall
BY Mann, Brown & Cox
ATTORNEYS.

Oct. 28, 1941.    M. A. KENDALL    2,261,088
BELT CONVEYER
Filed April 25, 1940    2 Sheets-Sheet 2
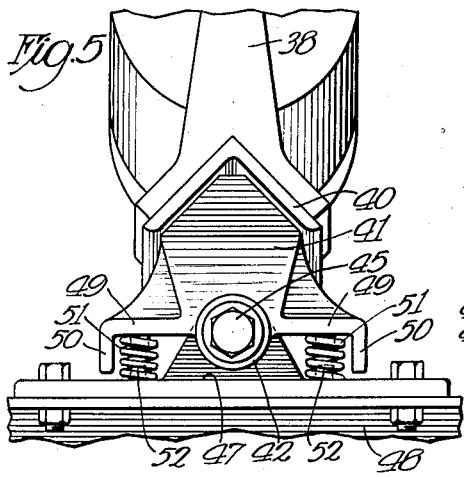
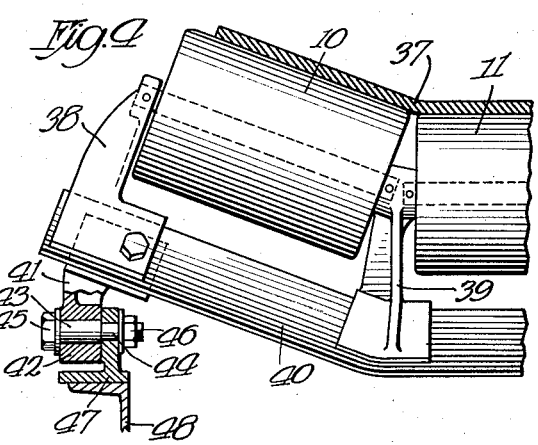
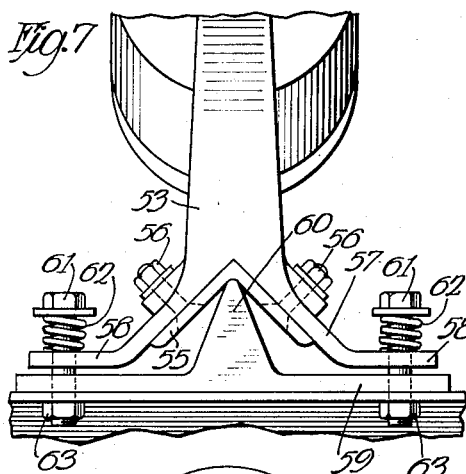
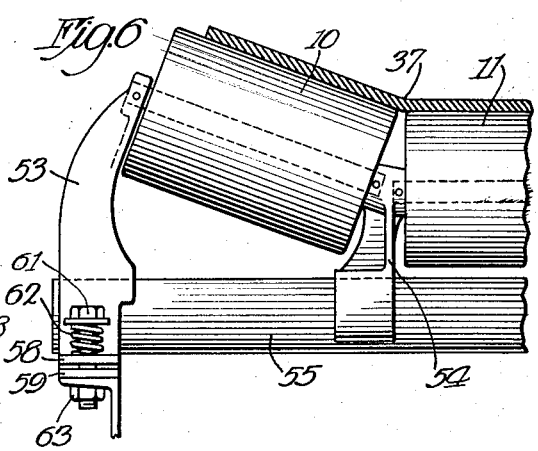
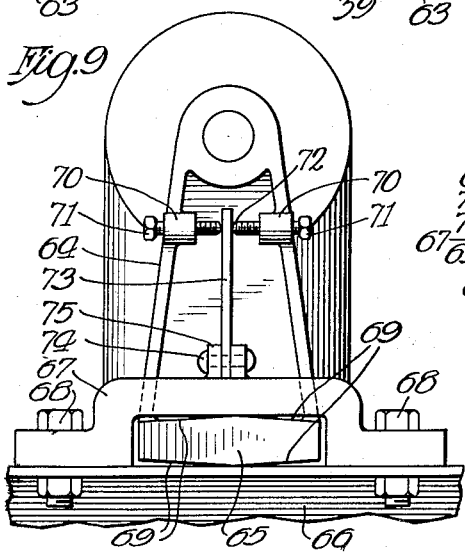
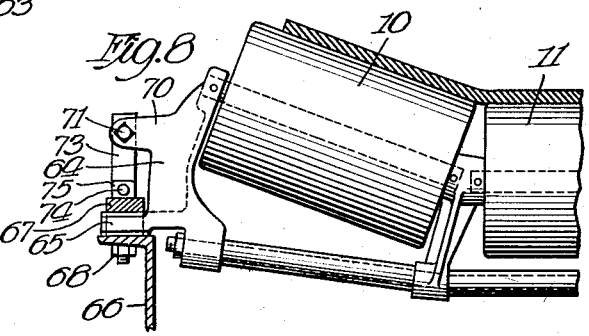
INVENTOR.
Myron A. Kendall
BY Mann, Brown & Cox
ATTORNEYS.

Patented Oct. 28, 1941

2,261,088

UNITED STATES PATENT OFFICE 2,261,088

BELT CONVEYER

Myron A. Kendall, Aurora, Ill., assignor to Stephens-Adamson Manufacturing Company, a corporation of Illinois Application April 25, 1940, Serial No. 331,630

9 Claims. (Cl. 198—202)

This invention relates to belt conveyers and has for its principal object to automatically guide or train a troughed belt in both directions of travel when the conveyer is inclined.

That is accomplished by mounting each carrier (or the troughing rollers thereof) to rock about a horizontal axis crosswise to the conveyer in response to the action of the belt and providing means to yieldingly resist the rocking movement and to restore the carrier, or the troughed rollers when the rocking pressure of the belt in one direction is relieved. Preferably, the mounting for the carrier, or the troughing rollers, includes a rubber bushing compressed lengthwise to the axis about which the rocking takes place, but many other devices may be used instead and some examples are given.

In the drawings—

Fig. 1 is a cross section through a belt conveyer embodying the invention and showing the main frame with one troughing carrier and the belt associated therewith;

Fig. 2 is an end view taken at one of the troughing carriers and indicating the extent of the rocking movement by dotted lines;

Fig. 3 is a section taken on the line 3—3 of Fig. 2 through one of the bearings for the carrier;

Fig. 4 is a partial cross section of a belt conveyer showing a modified form of construction;

Fig. 5 is an end view corresponding to Fig. 4, part of the carrier and the main frame being broken away;

Figs. 6 and 7 are views similar to Figs. 4 and 5, showing another modification, and Figs. 8 and 9 are also views similar to Figs. 4 and 5, showing still another modification.

These particular embodiments and the corresponding description, however, are used for the purpose of disclosure only and it is realized that the substance of the invention may be embodied in many other forms.

In Figs. 1, 2 and 3 the rollers 10, 11 and 12 are journaled on shafts 13, 14 and 15, mounted in side supports or brackets 16 and 17 and intermediate supports or brackets 18 and 19. A truss rod 20 passing through the brackets 16 and 17 at 21 and 22 and bearings 23 in the brackets 18 and 19, also passes through spacers 24 between the brackets and is equipped with nuts 25.

The supports 16 and 17, together with the shafts 13, 14 and 15, form the compression member of a truss in which the intermediate supports 18 and 19 form the thrust members and the truss rod 20 forms the tension member. By adjusting the nuts 25 the truss can be set in its proper position and by making the lengths of the spacers 24 correct for the distances they can be clamped between the supports to form a structure that is very rigid while being handled and shipped.

The form of carrier construction is disclosed more fully in my prior Patent, No. 2,179,186, of November 7, 1939.

Each of the supports or brackets 16 or 17 has its lower end formed into a hollow cylindrical bearing 26, adapted to receive a rubber bushing 27 through which a bolt 28 extends and is supported in a bracket 29 secured to the main frame 30 by bolts 31. The bracket 29 includes an upright triangular flange 32 having a bore 33 to receive the bolt 28, and the latter is equipped with a nut 34 which may be adjusted to compress the bushing 27 between the flange 32 and the head of the bolt 35.

The bushing 27 has a sliding fit in the bearing 26 and on the bolt 28, but it is longer than the bearing to allow for the adjustment of the nut 34 by which it is put under compression lengthwise. This has the effect of making it bind to both the bearing and the bolt and also gives it peculiar resilient qualities to resist the rocking movement of the carrier about the axis of the bolt 28.

The nut 34 is adjusted to suit the particular conditions and will make the rubber bushing give just the resistance suited to those conditions. When the belt conveyer is inclined it will yieldingly resist the tilting of the carrier in the direction the belt is being driven and will restore the carrier as soon as the pressure of the belt is relieved, thereby setting the carrier in position to be tilted in the opposite direction by the action of the belt when it is driven in reverse.

It is unnecessary for the carrier to rock more than about 2° from its normal or medial position, as indicated in dotted lines in Fig. 2, and in order to positively limit the rocking movement the brackets 16 and 17 are provided with feet 36, one of which will strike the bracket 29 when the carrier reaches the appropriate limit of movement in one direction.

With this arrangement, when the belt 37 is traveling to the right in Fig. 2, the carrier will automatically rock to the right and thus incline the troughing rollers 10 and 12, to make them guide or train the belt in the middle of the carrier. This movement will be yieldingly resisted by the bushings 27. Upon reversing the belt it will immediately rock the carrier in the opposite direction with like effect. The bushings 27 will restore the carrier to normal position as soon as the pressure in either direction is relieved and will yieldingly permit the desired rocking movement ultimately limited by the feet 36, if necessary.

This arrangement is particularly important in inclined conveyers in order to make sure that the belt is trained when it is running up the incline as well as down the incline.

In Figs. 4 and 5 the carrier is shown as including end brackets 38 and intermediate brackets 39, mounted on an angle bar 40, having its flanges inclined downwardly from the vertex and supported by bearing brackets 41, having hollow cylindrical bearings 42, journaled on the enlarged spindles 43, of bolts 44, having heads 45 and nuts 46. These bolts pass through supporting brackets 47 secured to the main frame 48 in a manner similar to that illustrated in Fig. 3.

The bearing brackets 41 have arms 49 terminating in feet 50 to strike the bracket 47 and limit the rocking movement of the carrier.

The rocking is yieldingly resisted by coil springs 51 between the arms 49 and the bracket 47 and held in place by lugs 52 extending into them.

In Figs. 6 and 7 the carrier is shown as including end brackets 53 and intermediate brackets 54, assembled on an angle bar 55 having its flanges inclined downwardly from the vertex and made fast by bolts 56. The arms 57 on the brackets 53 are extended laterally, as indicated at 58, to limit the rocking movement by contacting with the supporting brackets 59 carrying knife-edge bearings 60 received in the crotch of the angle 55. Bolts 61 extend through the outer portions of the arms 58 and the bearing bracket 59 and receive coil springs 62 to yieldingly resist the rocking movement of the carrier. The pressure of these springs and therefore their resistance may be adjusted by means of the nuts 63 on the bolts 61.

In Figs. 8 and 9 the carrier is of the truss type shown in Figs. 1 to 3, and the end brackets 64 are provided with flattened trunnions 65, projecting laterally and resting on the channels 66 of the main frame within the bearing brackets 67 secured to the journals by bolts 68. The upper and lower faces 69 of the trunnions are oppositely inclined, as best seen in Fig. 9, to give a sort of knife-edge character to the bearing and also afford positive limits for the rocking movement, substantially as disclosed in my prior Patent No. 2,179,186, of November 7, 1939.

The brackets 64 are also provided with arms 70 receiving bolts 71, the round ends 72 of which coact with the upper free end of a leaf spring 73 having its lower end made fast to the bracket 67 by the bolts 74 and lugs 75.

Those skilled in the art will readily design other forms suited to particular conditions and personal tastes. Some will prefer to have the inclined troughing rollers on a rocking support separate from the intermediate rollers. By way of specific example, a carrier of the type shown on sheet 1 for an 18" belt had a soft rubber bushing 27, 1½" long, 1⅜" outside diameter and ⅝" inside diameter. The other parts are roughly in proportion.

I claim:

1. In a belt conveyer, a troughing carrier including oppositely inclined rollers, supports for the inclined rollers mounted to rock both ways from their medial position to automatically tilt the rollers in the direction of travel in response to the action of the belt and means to yieldingly resist the tilting movement to either side of the medial position and tending to automatically restore the rollers to medial position when the action of the belt is relieved irrespective of the inclination of the belt conveyer.

2. In a belt conveyer, a troughing carrier including rollers, at least two of which are oppositely inclined to support the sides of the belt, supports for the inclined rollers mounted to rock both ways from their medial position automatically tilt the rollers in the direction of travel in response to the action of the belt and means to yieldingly resist the tilting movement to either side of their medial position in all operating inclinations of said carrier and for automatically restoring the rollers to medial position when the action of the belt is relieved.

3. In a belt conveyer, a carrier including oppositely inclined rollers and spaced supports, alined bearings for the supports allowing the carrier as a unit to automatically rock freely both ways from its medial position to tilt the inclined rollers in the direction of travel, and means for yieldingly resisting the rocking movement in both directions and to automatically restore the carrier to its medial position in all operating inclinations of said conveyer when the action of the belt is relieved.

4. In a belt conveyer, a carrier including a frame and oppositely inclined rollers carried by said frame for supporting the sides of the belt, means for pivotally mounting the carrier to rock each way from a medial position about a horizontal axis in response to the action of the belt, and means for yieldingly resisting the rocking movement in both directions and to automatically restore the rollers to medial position in all operating inclinations of said conveyer when the belt is unloaded and at rest in inclined position.

5. In a belt conveyer, a carrier including oppositely inclined rollers to support the sides of the belt, means for pivotally mounting the carrier to rock about a horizontal axis to either side of its medial position, said means including a supporting element of rubber, and means for distorting said element into gripping relation with said carrier whereby said element will yieldingly resist the tilting of the carrier to either side of its medial position.

6. In a belt conveyer, a carrier including oppositely inclined rollers to support the sides of the belt, means for pivotally mounting the carrier to rock about a horizontal axis including a hollow bearing element on the carrier, a rubber bushing in said element, and means for compressing that bushing along the axis about which the carrier is mounted to rock, whereby when said carrier is rocked to either side of its medial position, said rubber bushing will be distorted and will bias said carrier to its medial position when the belt is stopped.

7. In a belt conveyer, a main supporting frame, troughing carriers comprising a plurality of rollers, each of said carriers including oppositely inclined rollers, means to mount the inclined rollers to rock about a horizontal axis in response to the action of the belt and in the direction of the belt movement, and a yielding connection between said means and the main supporting frame to permit the rollers to rock to either side of their medial position and to automatically restore them to their medial position in all operting inclinations of said conveyer when the action of the belt is relieved.

8. In a belt conveyer, a main supporting frame, troughing carriers each including oppositely inclined rollers, means to mount the inclined rollers to rock about a horizontal axis to opposite sides of their medial position in response to the action of the belt, and springs to yieldingly resist the rocking movement of the rollers in the direction of the travel of the belt and to automatically restore the rollers to medial position in all operating inclinations of said conveyer, when the action of the belt is relieved.

9. In a belt conveyer, a main supporting frame, troughing carriers each including oppositely inclined rollers, means to mount the inclined rollers to rock about a horizontal axis to each side of the medial position in response to the direction of movement of the belt including a bearing element rocking with the rollers, and a spring cooperating with the bearing element to yieldingly resist the rocking movement in either direction in all operative inclined positions of said conveyer.

MYRON A. KENDALL.

CERTIFICATE OF CORRECTION.

Patent No. 2,261,088. October 28, 1941.

MYRON A. KENDALL.

It is hereby certified that error appears in the printed specification of the above numbered patent requiring correction as follows: Page 2, second column, line 10, claim 2, before "automatically" insert the word --to--; and that the said Letters Patent should be read with this correction therein that the same may conform to the record of the case in the Patent Office.

Signed and sealed this 9th day of December, A. D. 1941.

(Seal)

Henry Van Arsdale,
Acting Commissioner of Patents.